United States Patent
Williams et al.

(10) Patent No.: US 7,349,825 B1
(45) Date of Patent: Mar. 25, 2008

(54) SYSTEM HEALTH OPERATIONS ANALYSIS MODEL

(75) Inventors: Zachary C. Williams, St. Charles, MO (US); James L. Poblete, Bridgeton, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/564,129

(22) Filed: Nov. 28, 2006

(51) Int. Cl.
*G06F 11/30* (2006.01)
*G21C 17/00* (2006.01)

(52) U.S. Cl. .................................. 702/182
(58) Field of Classification Search ............. 702/182
See application file for complete search history.

(56) References Cited

U.S. PATENT DOCUMENTS 6,654,770 B2* 11/2003 Kaufman .................. 707/200
2005/0171660 A1* 8/2005 Woolford et al. .......... 701/33
2006/0235707 A1* 10/2006 Goldstein et al. ........... 705/1
2007/0027593 A1* 2/2007 Shah et al. ................ 701/30

OTHER PUBLICATIONS

Faas et al. "Vehicle health management research for legacy and future operational environments", Aug. 2001, IEEE, pp. 718-729.*

* cited by examiner

*Primary Examiner*—Michael P. Nghiem
*Assistant Examiner*—Cindy D. Khuu
(74) *Attorney, Agent, or Firm*—Lee & Hayes, PLLC

(57) ABSTRACT

Methods and systems for health operations analysis models to compare a first and second fleet of vehicles are disclosed. In one embodiment, a method for providing a system health operations analysis model including determining a first system health operations analysis of a first fleet of vehicles, determining a second system health operations analysis of a second fleet of vehicles, comparing the first and second system health operations analyses, and generating a system health operations output of the first and second system health operations analyses.

20 Claims, 11 Drawing Sheets

SYSTEM HEALTH OPERATIONS ANALYSIS MODEL

CROSS REFERENCE TO RELATED APPLICATIONS

This patent application is related to co-pending, commonly-owned U.S. patent application Ser. No. 11/564,183 entitled "Prognostic Condition Assessment Decision Aid", filed under US concurrently herewith on Nov. 28, 2006, and to commonly-owned U.S. patent application Ser. No. 10/770,672 entitled "Lifecycle Support Software Tool," filed on Feb. 2, 2004, now U.S. Pat. No. 7,206,708 which applications are hereby incorporated by reference.

FIELD OF THE INVENTION

The present invention relates to operational analysis of vehicles, and more specifically, to methods and systems for health operations analysis models to compare a first and second fleet of vehicles.

BACKGROUND OF THE INVENTION

The operation and maintenance of a fleet of military, commercial, or private vehicles can be economically burdensome for an organization. Many costs are realized over a period of time when an organization maintains a fleet of military, commercial, or private vehicles. Initial considerations are often limited to the cost of the vehicles, related design and development costs, and maintenance costs as the major considerations in acquiring or upgrading a fleet of vehicles. However, a number of considerations are often under-analyzed or completely ignored because they are not well understood by an organization. For example, reliability, maintainability, and testability are often not factors considered when determining the cost of a fleet of vehicles, although support requirements and health management are significant operational drivers for a fleet of vehicles.

The integration of health management into the initial design of a vehicle may include a detailed benefit analysis, including all of the operational performance benefits that an integrated health management system may provide. Such a detailed benefit analysis may include the observations and recommendations of original equipment manufacturers (OEMs), mission operators, command and control elements, fleet management, and maintenance operations.

Therefore, it would be advantageous to provide a system health operations analysis model providing performance improvement on a fleet of vehicles without disproportionately increasing operational costs, and while reducing the total ownership cost over the service life of the fleet of vehicles.

SUMMARY OF THE INVENTION

The present invention relates to methods and systems for health operations analysis models to compare a first and second fleet of vehicles. In one embodiment, a method includes providing a system health operations analysis model, comprising determining a first system health operations analysis of a first fleet of vehicles, determining a second system health operations analysis of a second fleet of vehicles, comparing the first and second system health operations analyses, and generating a system health operations output of the first and second system health operations analyses.

In another embodiment of the present invention, a computer-based system includes providing a system health operations analysis comprising an analysis component configured to compute a system health operations analysis of a first fleet of vehicles and a system health operations analysis of a second fleet of vehicles, a comparator configured to receive the system health operations analyses from the analysis component and to perform a comparison between the first and second system health operations analyses, and an output component configured to receive the comparison from the comparator and to provide a visual display of the comparison between the first and second system health operations analyses.

In yet another embodiment of the present invention, one or more computer-readable media comprise computer executable instructions that, when executed, perform a method of health operations analysis, comprising determining a system health operations analysis of a first fleet of vehicles to determine the operational costs of the first fleet of vehicles, determining a system health operations analysis of a second fleet of vehicles to determine the operational costs of the second fleet of vehicles, and wherein determining the system health operations analysis of at least one of the first and second fleets includes determining the system health operations analysis based on at least one of an actual operational data, an actual maintenance data, a hypothetical operational data, and a hypothetical maintenance data, comparing the first and second system health operations analyses and operational costs, and generating a system health operations output of the compared first and second system health operations analyses including at least one of cost metrics and reliability metrics.

BRIEF DESCRIPTION OF THE DRAWINGS

Embodiments of the present invention are described in detail below with reference to the following drawings.

DETAILED DESCRIPTION

The present invention relates to methods and systems for health operations analysis models. Many specific details of certain embodiments of the invention are set forth in the following description and in FIGS. 1 through 11 to provide a thorough understanding of such embodiments. One skilled in the art, however, will understand that the present invention may have additional embodiments, or that the present invention may be practiced without several of the details described in the following description.

Figure 1:
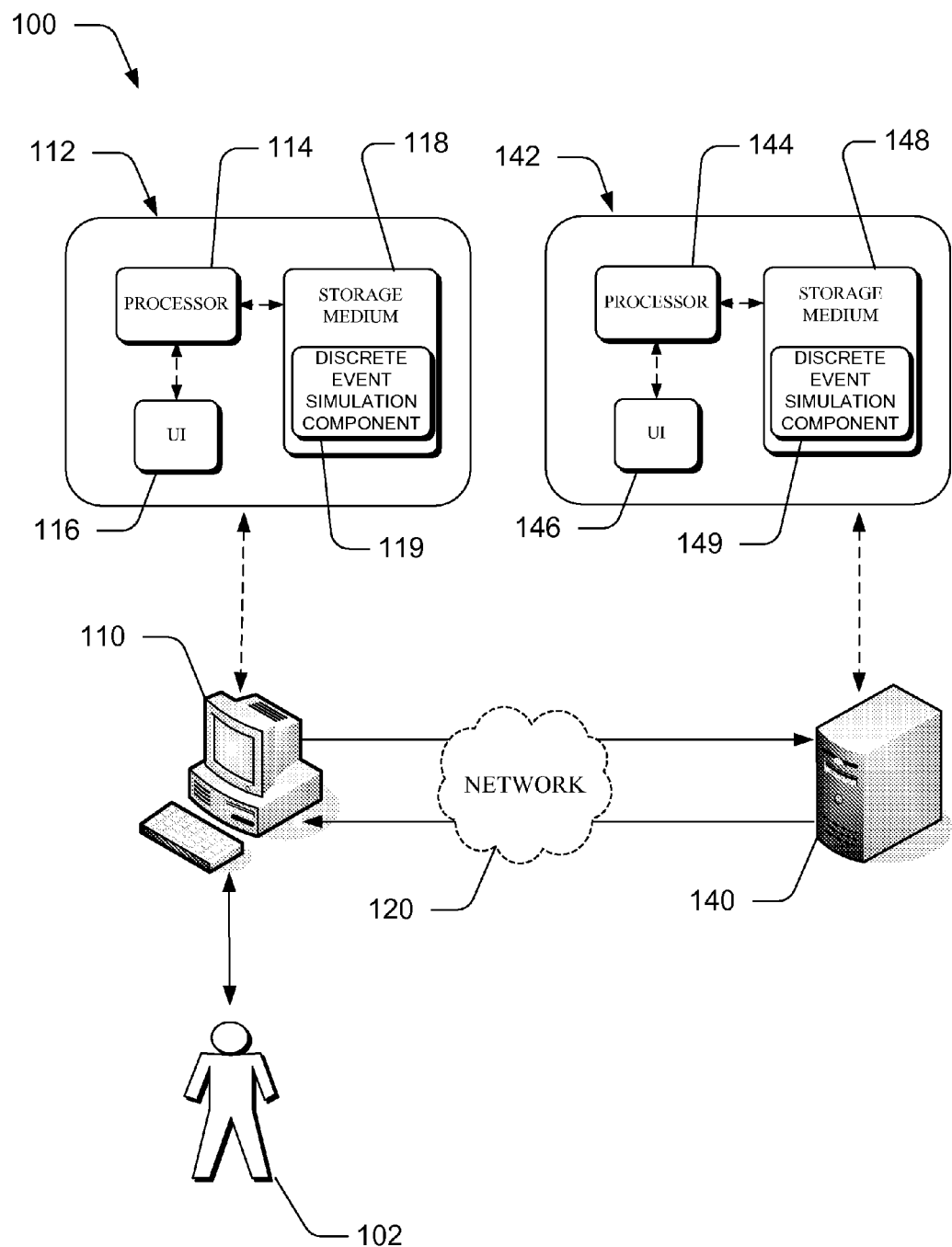
FIG. 1 is a block diagram of an overall environment in which computing devices interact between a user and a server and illustrates how a systems health operations analysis model may be organized in accordance with an embodiment of the invention.

FIG. 1 illustrates an overall environment 100 for operating health operations analysis models in accordance with an embodiment of the present invention. As shown in FIG. 1, a user 102 interacts with a computing device 110 in network connection 120 with a server 140. The computing device 110 may be a desktop, mobile, handheld, or laptop computer, or any other suitable computer-based device.

The computing device 110 may include a number of components 112. The components 112 may include one or more processors 114 that are coupled to instances of a user interface (UI) 116. The user interface 116 represents any devices and related drivers that enable the computing device 110 to receive input from the user 102, and to provide output to the user 102. Thus, to receive input from the user 102, the user interface 116 may include keyboards or keypads, mouse devices, touch screens, microphones, speech recognition packages, or the like. To provide output to the user 102, the user interface 116 may include speakers, display screens, printing mechanisms, or the like.

The computing device 110 may include one or more instances of a computer-readable storage medium 118 that are addressable by the processor 114. As such, the processor may read data or executable instructions from, or store data to, the storage medium 118. The storage medium 118 may contain a client-based discrete even simulation component 119, which may be implemented as one or more software modules that, when loaded into the processor 114 and executed, cause the computing device 110 to perform any of the functions described herein. Additionally, the storage medium 118 may contain implementations of any of the various software modules described herein.

Similarly, the server 140 may include a number of components 142. The server may include one or more processors 144 that are coupled to instances of a user interface (UI) 146. The user interface 146 represents any devices and related drivers that enable the server 140 to receive input from the user 102, and to provide output to the user 102. The server 140 may include one or more instances of a computer-readable storage medium 148 that are addressable by the processor 144. As such, the processor may read data or executable instructions from, or store data to, the storage medium 148. The storage medium 148 may contain a server-based discrete even simulation component 149, which may be implemented as one or more software modules that, when loaded into the processor 144 and executed, cause the server 140 to perform any of the functions described herein. Additionally, the storage medium 148 may contain implementations of any of the various software modules described herein.

Figure 2:
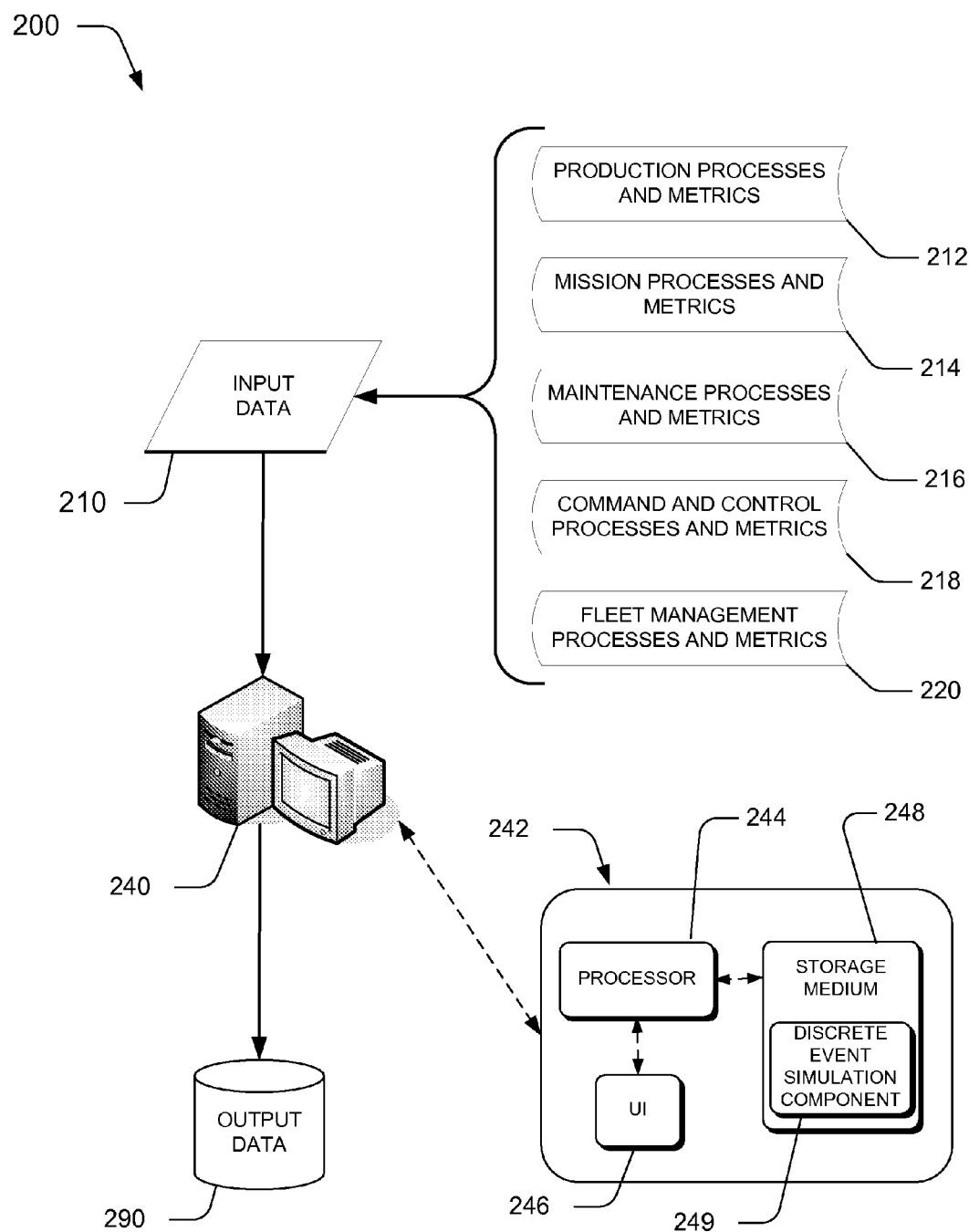
FIG. 2 is a flow diagram of a model for creating a system health operations analysis in accordance with an embodiment of the invention.

Having presented the above overview of the environment 100, the discussion now turns to a description of further details of the overall environment, now presented with FIG. 2.

FIG. 2 is a flow diagram 200 of a model for creating a system health operations analysis in accordance with an embodiment of the invention. Input data 210 is generated from a plurality of sources, each of which may include processes and metrics. In this embodiment, the sources include production processes and metrics 212, mission processes and metrics 214, maintenance processes and metrics 216, command and control processes and metrics 218, and fleet management processes and metrics 220. In alternate embodiments, other data sources may be used. Each of these sources, including the processes and metrics, may contain actual data from a fleet of vehicles. A fleet of vehicles is a plurality of vehicles. Alternatively, predicted or modeled data (together referred to as "hypothetical data") may be incorporated into some or all of the sources along with actual data, thus supplying the input data 210 with at least some hypothetical data. For example, when data does not exist for a particular source, such as mission processes and metrics 214, it may be desirable to input hypothetical data into this source to facilitate running of the analysis. In some embodiments, the sources may only contain actual data from a fleet of vehicles. In other embodiments, a source may contain only hypothetical data such as a source for a vehicle that is not currently in operation, but only exists in a conceptual stage of development.

Each data input 210 may include tasks and specific measures of effectiveness, or objectives. For example, the production processes and metrics 212 may include design, integration and production of the vehicles which meet the organization's contractual requirements, and further may focus on reducing costs for the original equipment manufacturers (OEMs). The mission processes and metrics 214 may include tasks such as performing missions, operating vehicles, and generating maintenance needs, and further may focus on mission reliability and mission effectiveness. The maintenance processes and metrics 216 may include tasks such as performing scheduled and unscheduled maintenance, and further may focus on maintenance man hours, awaiting maintenance time, inventory costs, and turnaround time. The command and control processes and metrics 218 may include tasks such as risk management and mission planning, and further may focus on effective mission generation, logistics, and scenario closure. Fleet management processes and metrics 220 may include tasks such as matching vehicles to mission requirements, maintenance planning, managing fleet health and planning deployments, and further may focus on managing costs, manpower, operational availability, and spare vehicles. Additionally, other input data sources may have their own specific measures of effectiveness related to operational goals.

The input data 210 is entered into a computing device 240, such as the computing device 110 or server 140 represented in FIG. 1, which processes the input data 210. The computing device 240 includes components 242 such as a processor 244, user interface 246, and storage medium 248. Additionally, the components 242 include a discrete event simulation component 249 in order to compute a system health operation analysis in accordance with an embodiment of the present invention.

As further shown in FIG. 2, the computing device 240 populates an output database 290 by processing the input data 210 using the discrete event simulation component 249. The output database 290 may then be used by a system health operation analysis model to compare the system health operations analysis of a first fleet of vehicles to the system health operations analysis of a second fleet of vehicles, or to some other standard for comparison, such as a theoretical standard, a target or projected standard, or any other suitable analysis result.

Figure 3:
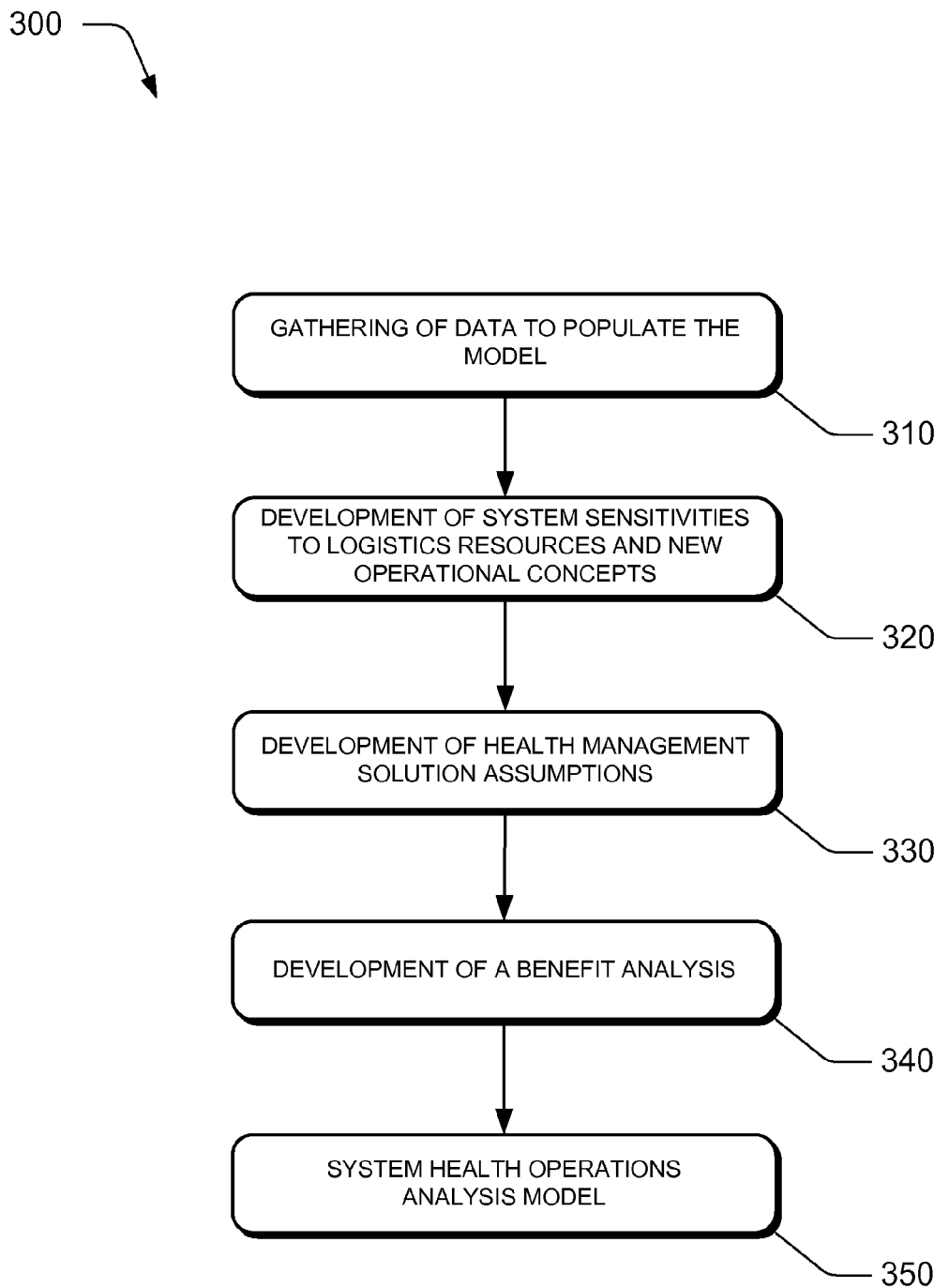
FIG. 3 is a flow diagram of another model for creating a system health operations analysis in accordance with an alternate embodiment of the invention.

FIG. 3 illustrates a flow diagram of a model 300 for creating a system health operations analysis in accordance with another embodiment of the invention. At block 310, data is gathered to populate the model. With reference to FIG. 2, this data may include data from one or more of the sources 212, 214, 216, 218, and 220, although additional sources may be utilized. Further, the data may be actual data, hypothetical data, or a combination of actual and hypothetical data. If a vehicle of a fleet under analysis is in current operational condition or existence, then inputs will usually be queried from the appropriate vehicle maintenance information system. The level of detail of the inputs may vary in some embodiments, depending on the amount of detail that is available for a fleet of vehicles. Further, in various alternate embodiments, the input data may represent varying periods of time, such as a one year history, or greater or lesser periods of time.

At block 320, system sensitivities to logistics resources and new operational concepts are developed. In some embodiments, the system sensitivity analysis may be the analysis of performance changes made possible by varying specific input parameters. For example, reducing fault isolation time on an avionics system input may increase the operational availability of a fleet or decrease manpower requirements (and therefore costs) of an organization. The magnitude of the system performance change, given equal increments of input change, will not typically be linear. Therefore, there is a "sensitive" input range that may be identified to develop solutions with a cost benefit that fits within cost constraints and program objectives. Further, system sensitivities may be input in the form of utilization rates, which act as effectiveness factors, and may vary the productivity or computation of an input data set.

At block 330, health management solution assumptions are developed. Various embodiments of analysis models may have a number of assumptions that must be made to support the analysis. Some of these assumptions may be relatively obvious from the information available from an existing fleet. Others may be less obvious, particularly if the vehicle under analysis is still in the conceptual phase. Some of the health management solution assumptions may overlap with input data in the case of a development program. For example, gate turn time may be available from a maintenance information system on a current platform. It may also be an important factor that must be verified before conducting analysis on the model. In some embodiments, the health management solution assumptions developed at block 330 may include: development period, aircraft production schedule, fleet size, aircraft service life, aircraft utilization, average flight duration (hours), maintainer labor rates, maintenance resources and schedules, average gate turn time, operational tempo changes (flight schedule changes), and mission types, priorities, and other features. Additionally, a health management solution may also include the following assumptions: event horizon, prognostic coverage, ability to fault forwarding (e.g., providing an RF link to maintenance services), and fault ambiguity of the forwarded message.

At block 340, a benefit analysis is developed. In some embodiments, the benefit analysis feeds into a comprehensive business case, and may include factors such as engineering cost estimates which illustrate a second fleet cost versus a benefit of a second fleet's solution (e.g., cost to install a new apparatus versus benefit realized thorough implementation of a new system or apparatus). For example, the benefit analysis may be developed to account for a number of maintenance man hours used, incorporating different rates of pay for each type of maintenance position, and including the times when those positions are utilized.

At block 350, a system health operations analysis is created for a fleet of vehicles. In one embodiment of environment 300, the system health operations analysis model will incorporate data from each of the proceeding blocks (310, 320, 330, 340).

Figure 4:
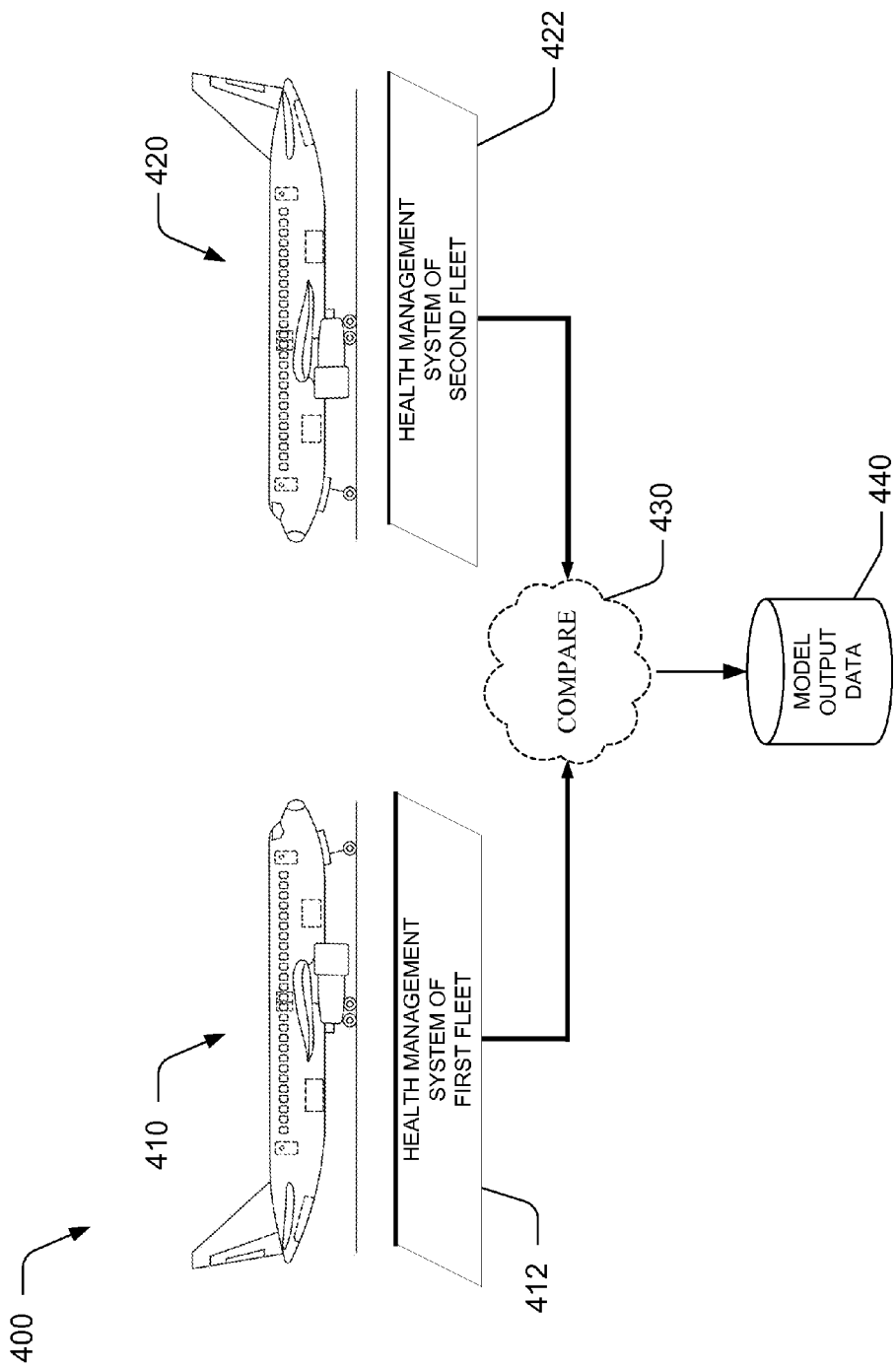
FIG. 4 is a schematic view of a model for comparing two system health operations analyses in accordance with another embodiment of the invention.

FIG. 4 is a schematic view of a model 400 for comparing two system health operations analyses in accordance with another embodiment of the invention. The comparison may include a first fleet of vehicles 410 and a second fleet 420 of vehicles. The vehicles may be airplanes, automobiles, trucks, maritime vessels, weapons, missiles, unmanned aerial vehicles, machinery and equipment used in aboveground or underground mining, buses, trains, railroad equipment, and other types of manned or unmanned mobile platforms. The vehicles may be used for military, commercial, or private use. For example, commercial aircraft (as shown in FIG. 4) and military aircraft may provide large fleets of vehicles while managing large operational budgets. Additionally, the vehicles may include drivers, pilots, captains, or other human operators, or they may be computer controlled from a remote location, such as a drone aircraft controlled by a computer and remote operator or autonomously guided.

The first and second fleet of vehicles 410, 420 may be a group of similar vehicles, such that they are all of the some model and production year, or they may have substantial variance in configuration. More specifically, in some embodiments, the vehicles in the first fleet 410 may be substantially the same vehicles as the vehicles in the second fleet 420, while in other embodiments, some aspects of the first and second fleet of vehicles are different. For example, in a particular embodiment, the first fleet 410 may be a fleet of Boeing 737 commercial airplanes in an existing operational configuration while the second fleet 420 may be a fleet of Boeing 737 commercial airplanes with a new (or proposed) operational configuration. Alternatively, the vehicles in the first fleet 410 may be different vehicles than those in the second fleet 420 of vehicles. For example, in another particular embodiment, the first fleet 410 of vehicles may include a fleet of Boeing 737 commercial airliners while the second fleet of vehicles 420 may include a fleet of Boeing 787 commercial airliners. In the above example, it is contemplated that an organization may want to determine if it would be cost effective to convert a fleet of 737 airplanes to a fleet of 787 airplanes. While this example may assume both the first fleet of vehicles 410 and second fleet of vehicles 420 are in current operational status, this may not necessarily be true. If the 787 airplanes in the above example are under development, they may entail proposed or hypothetical data inputs into a system health operations analysis.

Once the configuration of the first and second fleet of vehicles 410, 420 is determined, the system health operations analysis of the first and second fleet 412, 422 may be determined. The system health operations analysis of the first and second fleet 412, 422 are then compared 430 in order to create an output database 440. The output database 440 may contain data and information concerning the system health operations analyses of the first and second fleets 412, 422, and other relevant data such as cost analysis, life cycle analysis, input assumptions, and the like. The output database 440 enables a researcher or analyst to extract data in order to make a determination upon whether the second fleet has an optimal health management system resulting in metrics linked to operational goals. For example, a researcher or analysis might want to determine a point in future where the initial investment in upgrades to the second fleet of vehicles 420 are realized by cost savings from a proposed implementation of a system or apparatus on the second fleet of vehicles 420 that is not configured on the first fleet of vehicles 410. Other outputs to database 440 may include accumulation of fleet utilization hours, completed versus aborted missions, and the accumulation of flight time.

Figure 5:
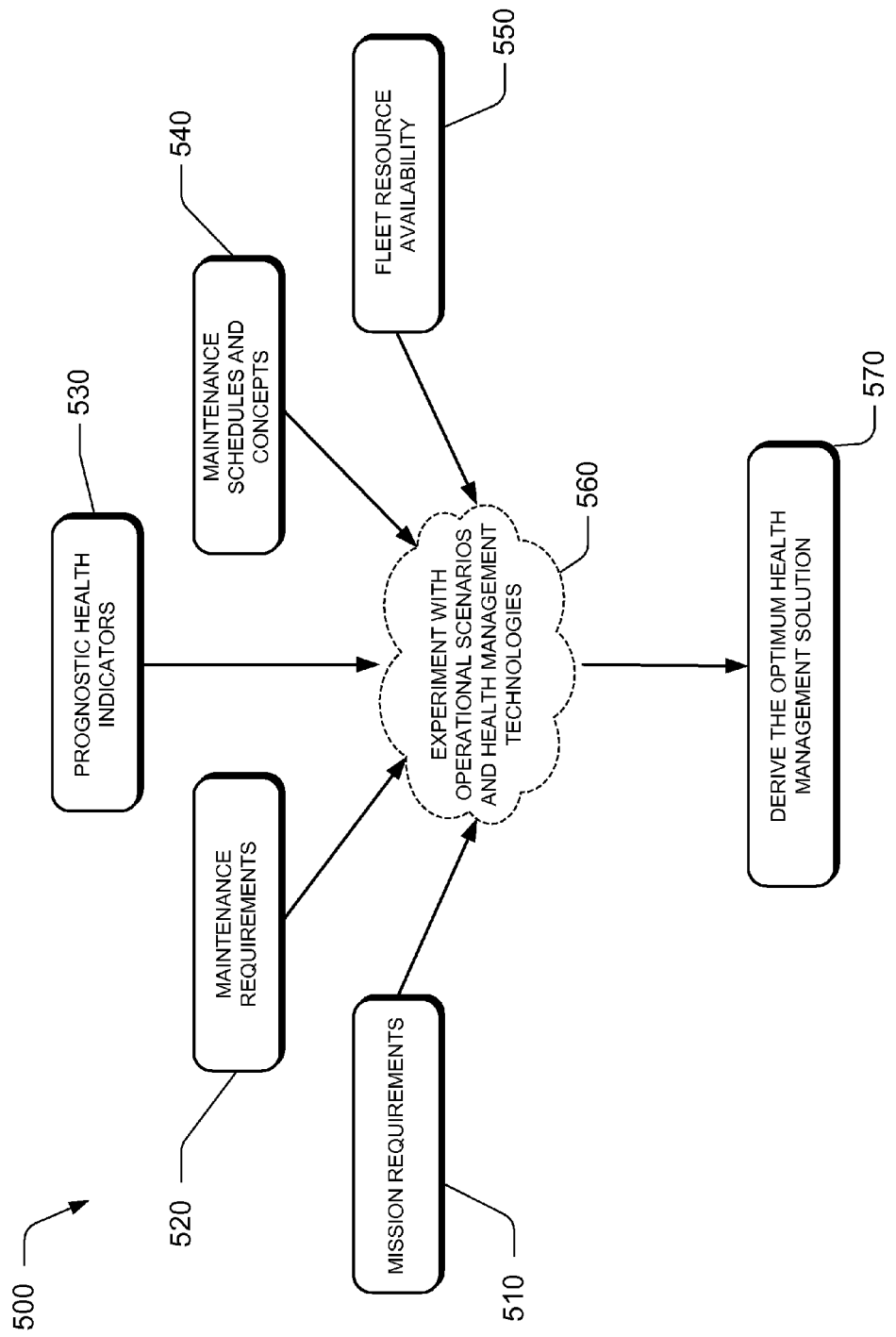
FIG. 5 is a schematic view of another model for comparing two system health operations analyses in accordance with another alternate embodiment of the invention.

In FIG. 5, a schematic view of another model 500 for comparing two system health operations analyses is presented. Various data inputs are compiled for a first and second fleet of vehicles 410, 420 (FIG. 4,) such as mission requirements 510, maintenance requirements 520, prognostic health indicators 530, maintenance schedule and concepts 540, and fleet resource availability 550.

The mission requirements 510 include information relating to the number of flights, missions, or trips of a fleet. For example, in the situation where a fleet is a group of carrier vans, the number of trips for the first fleet may be set to one hundred (100) for a day. More specific information relating to each trip may also be included in the mission requirements 510 such as the mission priority, mission duration, mission requirements, and other ongoing missions. Further, the mission difficulty, climate conditions, time between missions, rate of travel, and other information relating to the flight, mission, or trip may be included in the mission requirements 510.

The maintenance requirements 520 include information relating to maintenance activities for each fleet of vehicles. Maintenance requirements may include scheduled maintenance such as routine fluid monitoring and fluid replacement of a vehicle. Additionally, maintenance requirements may include scheduled inspections. Maintenance requirements may also evaluate maintenance utilization, maintenance resources, availability of spare parts, downtime, and other metrics that involve costs to maintain a fleet of vehicles. Costs and metrics associated with man hours and inventory may be significant factors in the maintenance requirements 520, and may include time to complete maintenance on subsystems and order parts to replace inventory.

As further shown in FIG. 5, the system health operations analyses may also include prognostic health indicators 530. For example, prognostic health indicators 530 may include unscheduled maintenance that may be anticipated (predicted with a certain accuracy) and statistically modeled through a time element referred to as "event horizon", and may be an important component of maintenance, but may not exist under the traditional maintenance requirements 520. Historical and statistical information may be used to model failure rates of a fleet of vehicles which require unscheduled maintenance. Predictive maintenance capability (e.g., prognostic health indicators) may be inserted as an event horizon. This may be translated into an engineering design requirement once the appropriate event horizon is identified through use of the system health operations analysis model.

Maintenance schedules and concepts 540 is yet another element that may be included in a comparison of the system health operations analyses. Maintenance schedules and concepts 540 may include fault forwarding. Fault forwarding involves communicating a maintenance request to a maintenance scheduler before the vehicle is actually available for maintenance. For example, if a sensor on an airplane detects a part failure, that "fault" may be forwarded to the maintenance scheduler who can coordinate manpower, equipment, and other maintenance needs in order to efficiently maintain or repair the airplane upon its arrival at the maintenance location.

Fleet resource availability 550 is yet another element that may be included in a comparison of the system health operations analyses. Fleet resource availability may include vehicle schedules, maintainer schedules, spare vehicle acquisitions, resource planning, and other related activities for a fleet of vehicles. One fleet resource availability issue involves a decision whether to fix a vehicle or to continue operation of the vehicle (hereinafter "fix or fly decision"), which controls when maintenance is conducted. The fix or fly decision is an application of risk tolerance which may impact whether a flight, mission, or trip occurs or instead, whether maintenance must be performed. The event horizon is the predictive capability of the system to determine the amount of time before the next unscheduled maintenance. Conditioned based maintenance may be included within fleet source availability 550. Condition based maintenance may utilize one or both of event horizon and fix or fly decisions, such as if a vehicle may continue in service or should be scheduled for maintenance. Additionally, condition based maintenance may remove scheduled maintenance requirements on components (e.g., routine inspections) and insert the capability to evaluate the condition of components at any point in time to facilitate replacing components at the optimum point in time. For example, if a failure is predicted, but it is not a catastrophic failure, a conditioned based maintenance system may decide to conduct maintenance at the most cost effective time, even if that means jeopardizing the occurrence of a failure before maintenance is performed. In catastrophic failure scenarios, condition based maintenance may be used on a more conservative level, or other appropriate precautions may be implemented.

At process 560, experimentation with operational scenarios and health management technologies may be performed on the various elements described above including mission requirements 510, maintenance requirements 520, prognostic health indicators 530, maintenance schedule and concepts, 540, and fleet resource availability 550 in order to evaluate the system health operations analysis of a first and second fleet of vehicles. The experimentation with operational scenarios and health management technologies 560 may permit the derivation of optimum health management solutions 570. The optimum health management solutions 570 may be related to operational costs, reliability, and operational effectiveness. Additionally, fleet metrics may be targeted for other organizational improvements such as those depicted in FIG. 2, elements 212, 214, 216, 218, 220, and for the different processes and metrics associated with a fleet of vehicles.

For example, a researcher may desire to derive the optimum health management solution for a second fleet of vehicles by targeting maintenance requirements such as utilization of maintenance workers in order to reduce maintenance costs, and in turn overall fleet operational costs. Therefore, the researcher may run different scenarios of the environment 500 in order to create an optimum health management solution for a second fleet by manipulating the maintenance requirements 520. Further, it is contemplated that any of the other elements, or combination thereof, may be manipulated in order to derive the optimum health management solution 570 for a second fleet of vehicles.

When comparing a first and second fleet of vehicles, some informational data inputs may be substantially the same while others may vary to a considerable degree. For example, the mission duration and mission requirements of a first and second fleet may be substantially similar while the mission priority is substantially different for the second fleet of vehicles. The analysis by a researcher may focus on cost, reliability, or other targeted improvements for a second fleet of vehicles.

Figure 6:
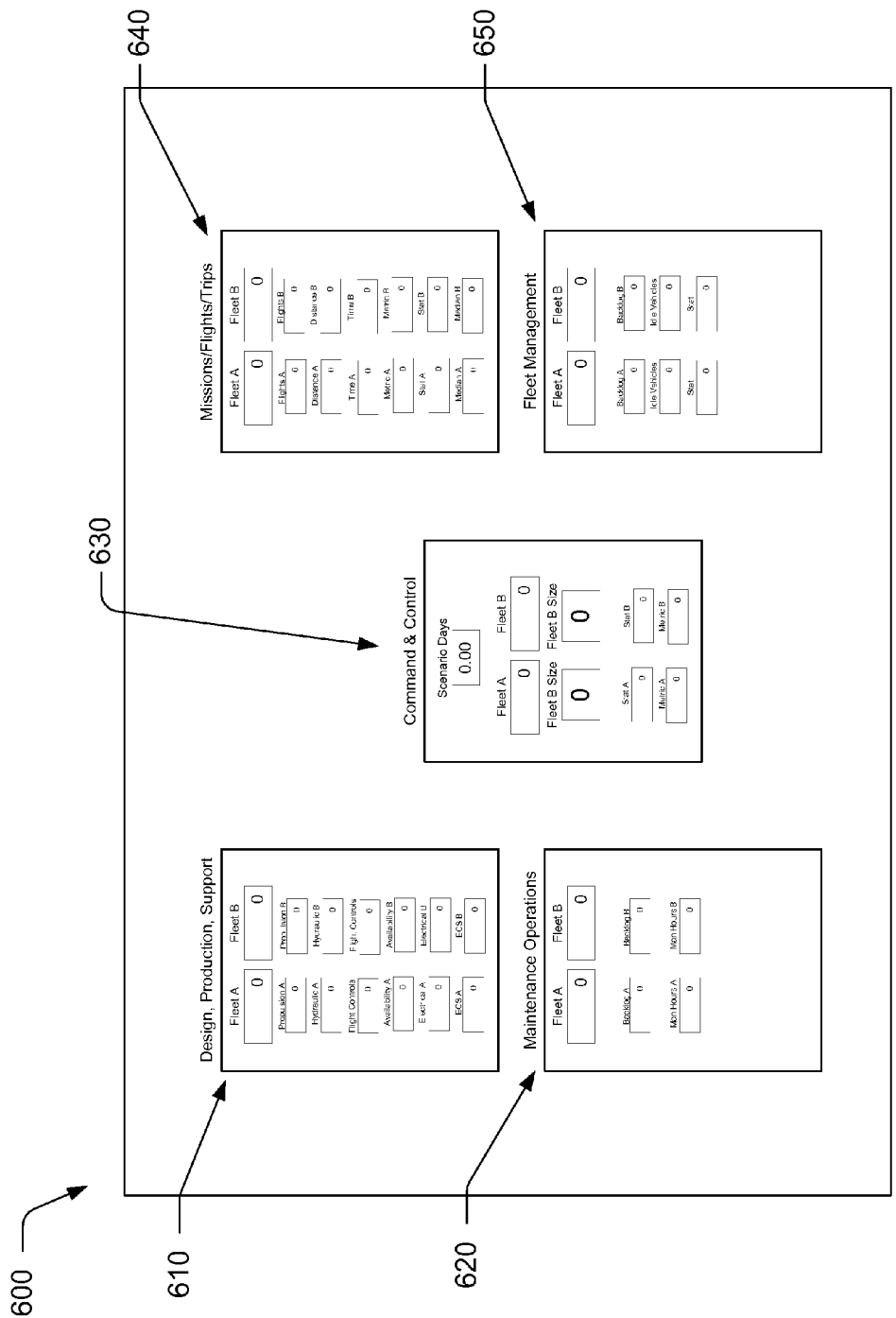
FIG. 6 is a computer application image depicting a system health operations analysis model user interface in accordance with an embodiment of the invention.

In FIG. 6, an embodiment of a model 600 for comparing the system health operations analysis of a first and second fleet of vehicles is depicted. The model 600 may include various data inputs and display elements (610, 620, 630, 640, 650), as described more fully below. Data may be inputted on the computer user interface, while additional data may be input from other sources such as databases or spreadsheets (e.g., Microsoft Excel). The model 600 may be used to view an animation of a system health operations analysis model as it performs a simulation of two or more fleets of vehicles, or it may be used to obtain a final output from the system health operations analysis model.

The model 600 may include a design, production, and support element 610. The design, production, and support element 610 may include sub-elements such as propulsion, hydraulics, flight controls, avionics, electrical, wiring, ECS, landing gear, and structures for a first and second fleet (depicted as 'A' and 'B'). Other sub-elements may be included in the design, production, and support element 610. Further, sub-elements can also be modified, expanded, or reduced according to the requirements of the model 600. The model 600 may also include a maintenance operations element 620. The maintenance operations may include sub-elements for maintenance man hours, fleet backlog, and other related sub-elements. The model 600 may further include a command and control element 630 including sub-elements such as scenario days, daily flights, schedule rate, and other related sub-elements. Further, the model 600 may include a missions/flights/trips element 640, with sub-elements such as age of aircraft, mission attributes, vehicle condition, mission status and other related sub-elements. Additionally, element 640 may show the number of flights currently taking place, mission/flight reliability, or percentage of scheduled missions/flights that were completed, and number of failures in sub-elements for each fleet throughout a simulation run. The model 600 may also include a fleet management element 650 with sub-elements such as mission backlog, idle vehicles, and other related sub-elements. Some of the sub-elements may be for data input or data display, while some may include a combination of data input and display of data. Additionally, some sub-elements may include data input or display of data for both a first and second fleet while other data input or display of data may only include a single value. For example, in the command and control element 630, the "scenario days" sub-element may only include a single value while the schedule rate may only include data input or display of data for each of the two fleets. The single value typically illustrates a scenario input that is being applied to both fleets.

In some embodiments, the system health operations analysis model 600 may run an animation of a fleet comparison. In an example animation process, the "entities" that may enter the mission flight elements are vehicles that have a mission assigned, and therefore contain those mission attributes. Immediately before leaving the missions/flights/trips sub element, the missions and vehicles may be separated and become two distinct entities. The mission entities may then proceed to command and control to determine missions and to tally mission statistics. Last, the vehicles may go back to fleet management for evaluation of maintenance needs. Additionally, the animation speed may be adjusted to increase or decrease the rate of analysis. For example, a researcher or analyst may want to observe the changes in the model over a short period in one study while in another study may want to observe the changes over a number of years. Another entity may be generated in a flight sub-model to represent messages during missions such that they are relayed back to maintenance. For example, using messages, maintainers can start the maintenance preparation without doing actual repairs until the plane's arrival, such as by getting parts in place, researching the problem, etc. Sub-models below the displays may provide logic on the flow of the entities.

Figure 7:
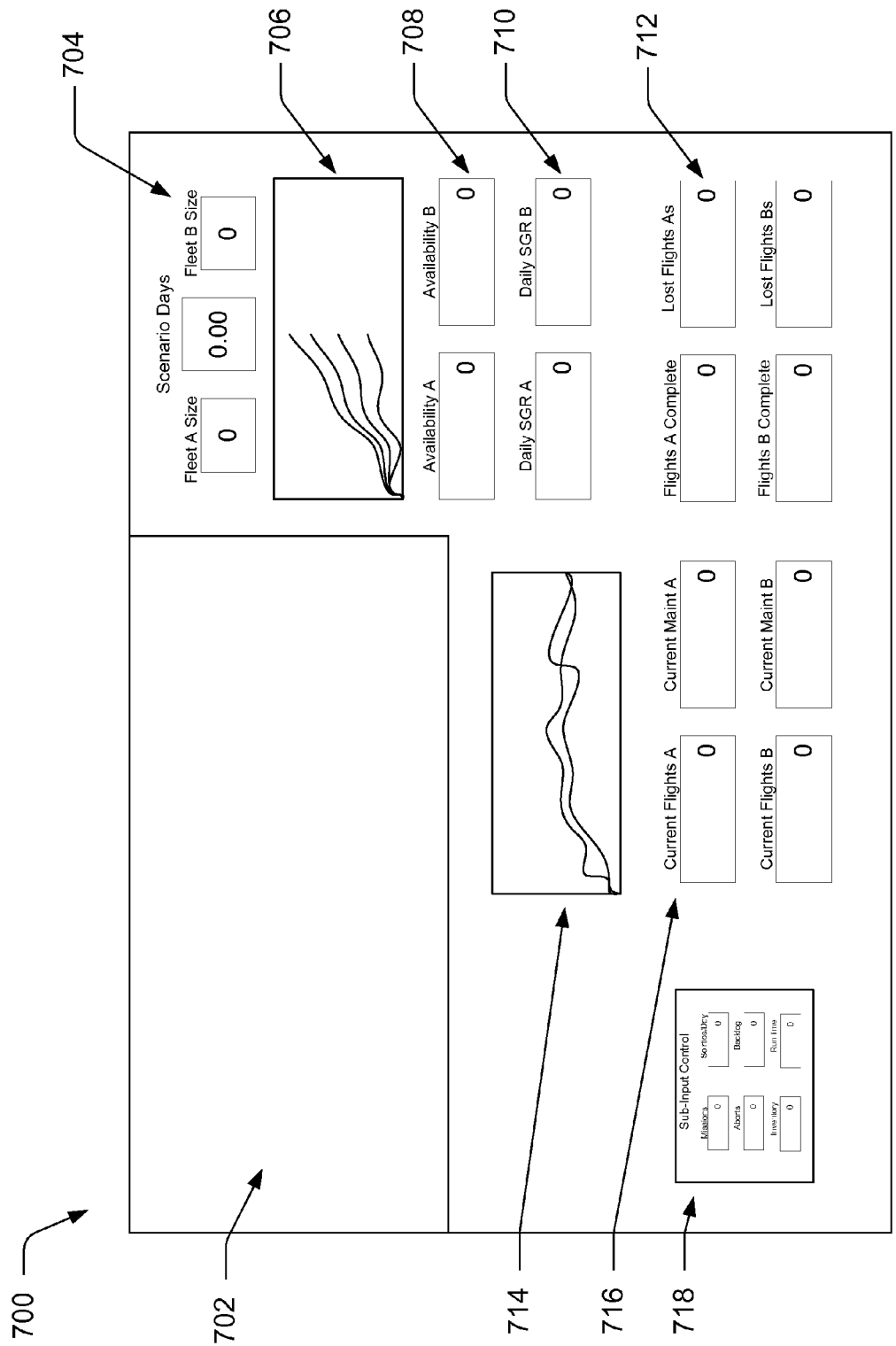
FIG. 7 is a command and control console in accordance with another embodiment of the invention.
Figure 8:
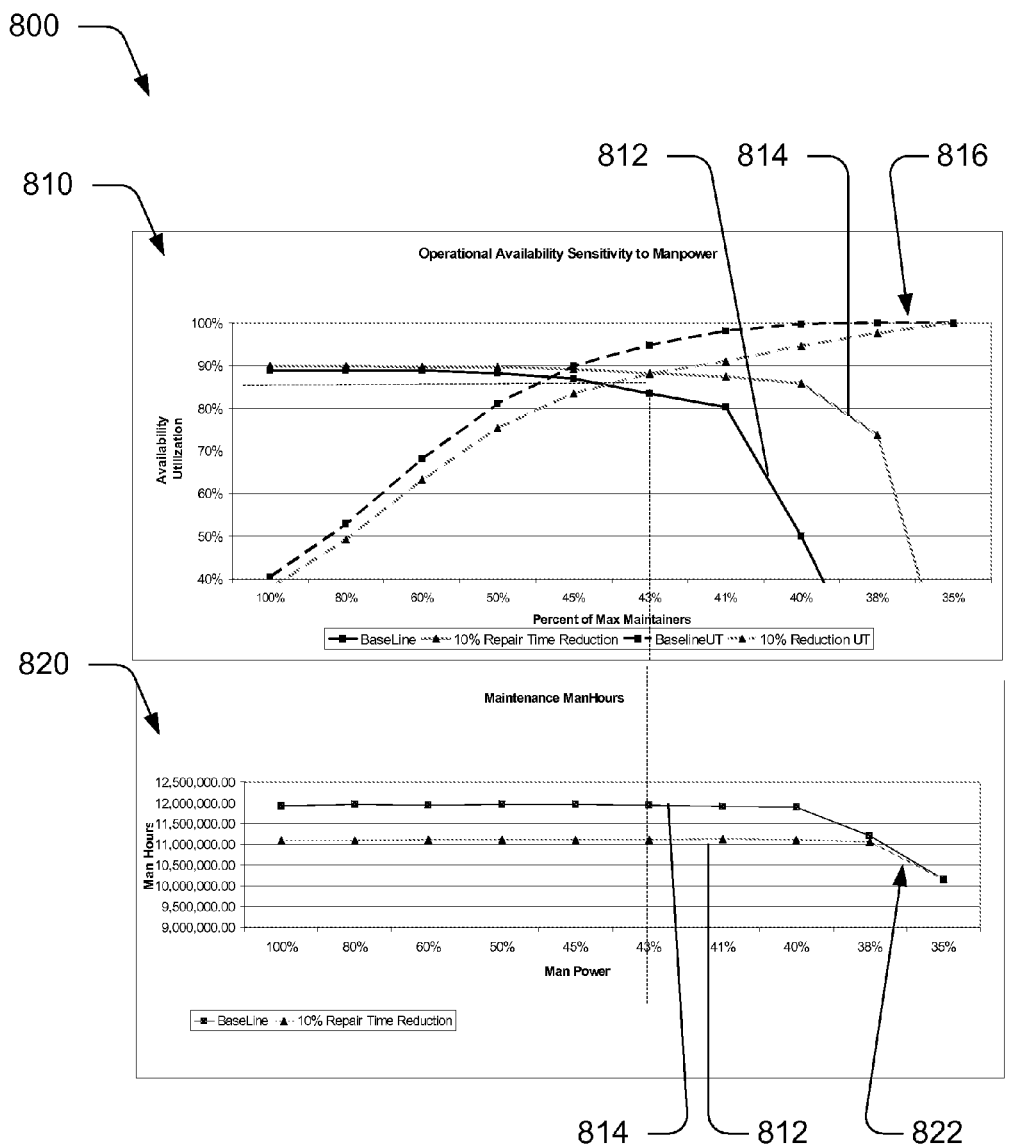
FIGS. 8 and 9 show representative graphs of output data generated using embodiments of system health operations analysis models in accordance with the present invention.

In FIG. 7, an embodiment of a command and control console of a first and second fleet of vehicles is depicted in environment 700. The command and control console may convey the integration of vehicle health status and mission status into one decision console. Traditionally, maintenance and mission considerations are separate decisions performed by different organizations. The command and control console may be for animation purposes or may be used to collect data reflecting the execution of maintenance and mission operations in other areas of the model.

With continued reference to FIG. 7, some embodiments of the command and control console may include a number of elements. A simulated real-time mission status of vehicles may be shown over a world map (or other map) view 702. Portions of the simulation console may change colors, indicating a different status of the simulation run. Additionally, fleet operational metrics may be included in the command and control environment 700. The fleet size of a first and second fleet of vehicles (fleet A and B) 704 may change due to retiring a vehicle after use by a production schedule that allocates vehicle production over time. A graph 706 of operational availability over time may also be included. Operational availability may be one of the primary performance metrics for military fleets to track maintenance performance. The time plot may track the average availability for multiple fleets over time to illustrate relative performance. For purposes of validation and error checking, each fleet's operational availability may be computed using two or more different methods. For example, the operational availability may be the result of the total time minus maintenance time, divided by the total time. Below the operational availability graph may be instantaneous illustrations of operational availability for each fleet 708. These may be the number of vehicles in the fleet that are not in maintenance divided by the total fleet population. Illustrations of the daily sortie generation rate may also be depicted 710. This may be the number of missions, flights, or trips that were achieved by the fleet for the period time period, such as the previous day. This may be updated at the end of each period.

On the lower right portion of the command and control environment 700, the flights complete and flights lost may be represented 712. This may also be known as missions complete and missions aborted, respectively. Lost flights and missions aborted means that the vehicle had to end the mission prematurely or divert from the scheduled destination. Additionally, the model may depict vehicle failures that lead to accidents (not shown).

A time plot 714 may illustrate the accrual of missions/flights/trips over time. This may be useful in scenarios in which a certain number of missions, flights, or trips need to take place over a period of time. Each fleet may be plotted to illustrate relative performance. Additionally, a number of windows 716 may illustrate the number of vehicles in flight for each fleet and the number of vehicles in maintenance for each fleet. A portion of the screen may also display inputs of the model 718.

The command and control environment 700 may include other elements to facilitate animation, research, and analysis of one or more fleet of vehicles. Further, some of the elements described above may not be included in order to simplify the animation, reduce complexity, or achieve other desired results.

Embodiments of methods and systems for health operations analysis models in accordance with the present invention may be used to generate a variety of different outputs for analysis. For example, in FIG. 8, an upper chart 810 shows an operational availability sensitivity to manpower, while a lower chart 820 depicts the total maintenance man hours. The charts 810, 820 in environment 800 depict the manpower analysis of a baseline fleet 812, and an upgraded fleet 814 with an advanced diagnostics system that yields an overall average of 10% reduction in repair times. The result may be improved availability given the same number of maintenance personal and costs. This is illustrated in the upper chart 810 that plots the changes in availability and utilization given changes in manpower. On the right side of the upper chart 810, the reduction in manpower results in utilizations approaching 100% (designated generally as 816). In the lower chart 820, availability performance falls dramatically (designated generally as 822) because there are simply too few resources to perform the required maintenance as manning levels are decreased.

These charts 810, 820, created from multiple simulation runs of a system health operations analysis model with different manpower levels, demonstrate the sensitivities of the utilization of maintainers and the effects on the fleets' operational availabilities. These charts provide a comparison between a manpower baseline and changes to manpower. The 100% manpower is the maximum quantity of maintainers required at any given time. The quantity is reduced until operational availability drops to zero or maintainer utilization rises to about 100%, thus enabling the identification of the optimum manning level and for the operation of a fleet of vehicles. It should be appreciated that this is just one example of numerous sensitivities that can be charted.

Figure 9:
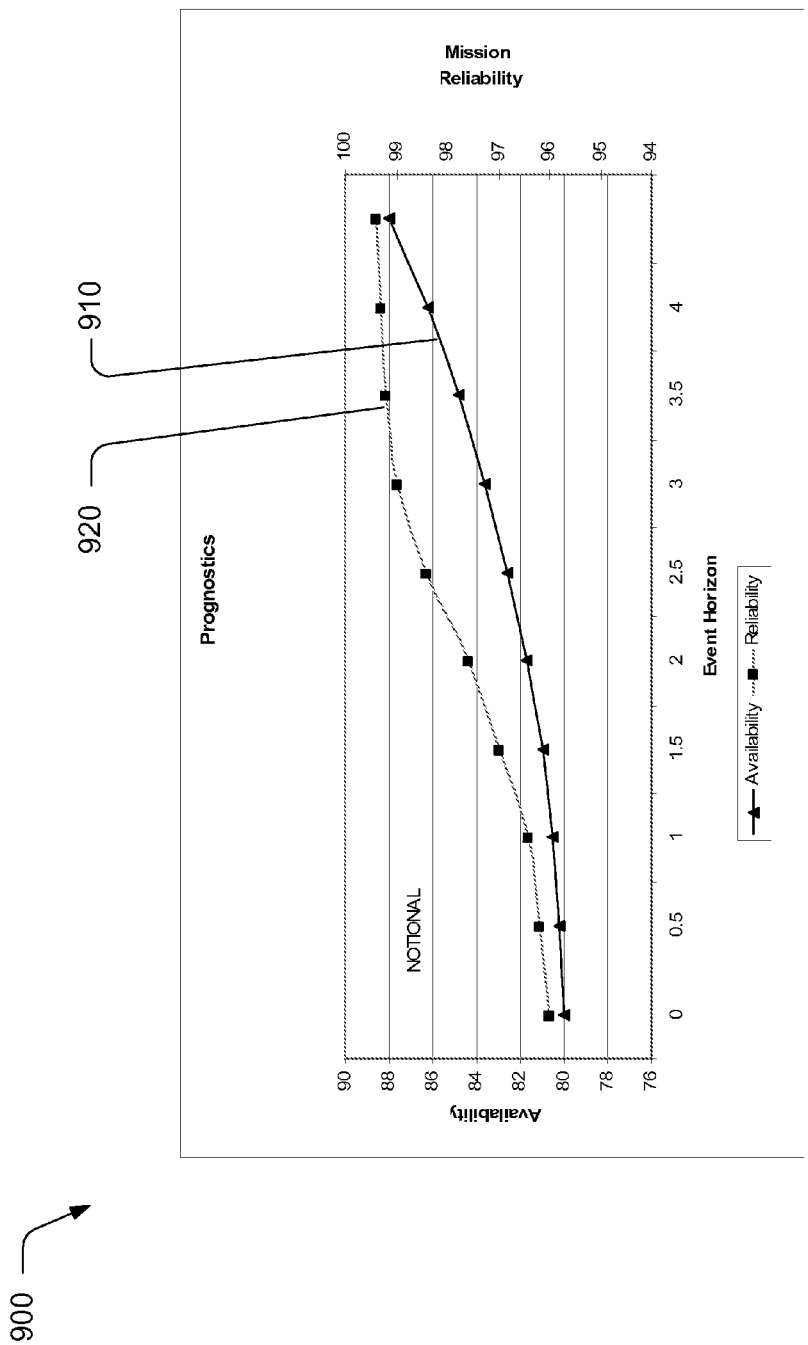

In FIG. 9, a prognostics graph 900 is depicted. More specifically, the graph 900 shows the impact of prognostics on availability 910 and mission reliability 920. The event horizon on the x-axis is the average hours of predictive time provided before the failure indication becomes extreme enough to result in significant functional loss or failure. By enabling the elimination of scheduled inspections and removals at conservative time intervals, prognostics may increase component service life. This may enable maintenance to be performed at more opportune times while minimizing interruptions in missions. Certain event horizons can provide significant improvements on the availability of the fleet until its return diminishes. This can show the desired event horizon to maximize the benefits of prognostics.

A vast number of other charts and outputs may be created by system health operations analysis models in accordance with the present invention based on the needs of a researcher or analyst. Other outputs from multiple simulation runs may include mission reliability, which is the percentage of successful missions out of the total launched missions. Additionally, operational availability sensitivities may be outputted based on any of the following: changes in mean times between failures, changes in mean times between repairs, changes in scheduled maintenance intervals, percentages of missions that take place in remote sites, and percentages of faults that are forwarded to maintenance while aircrafts are still in the air. It is further contemplated that any of the inputs of the model may be isolated and analyzed for their overall effect on the model. Therefore, every input may reveal information about other inputs, requiring statistical analysis such as regression analysis in order to derive correlations and conclusions from the model. The data outputs incorporate information from both command and control inputs (operations related inputs) and maintenance related inputs, such as maintenance decisions, in order to make comparisons of two fleets of vehicles.

Figure 10:
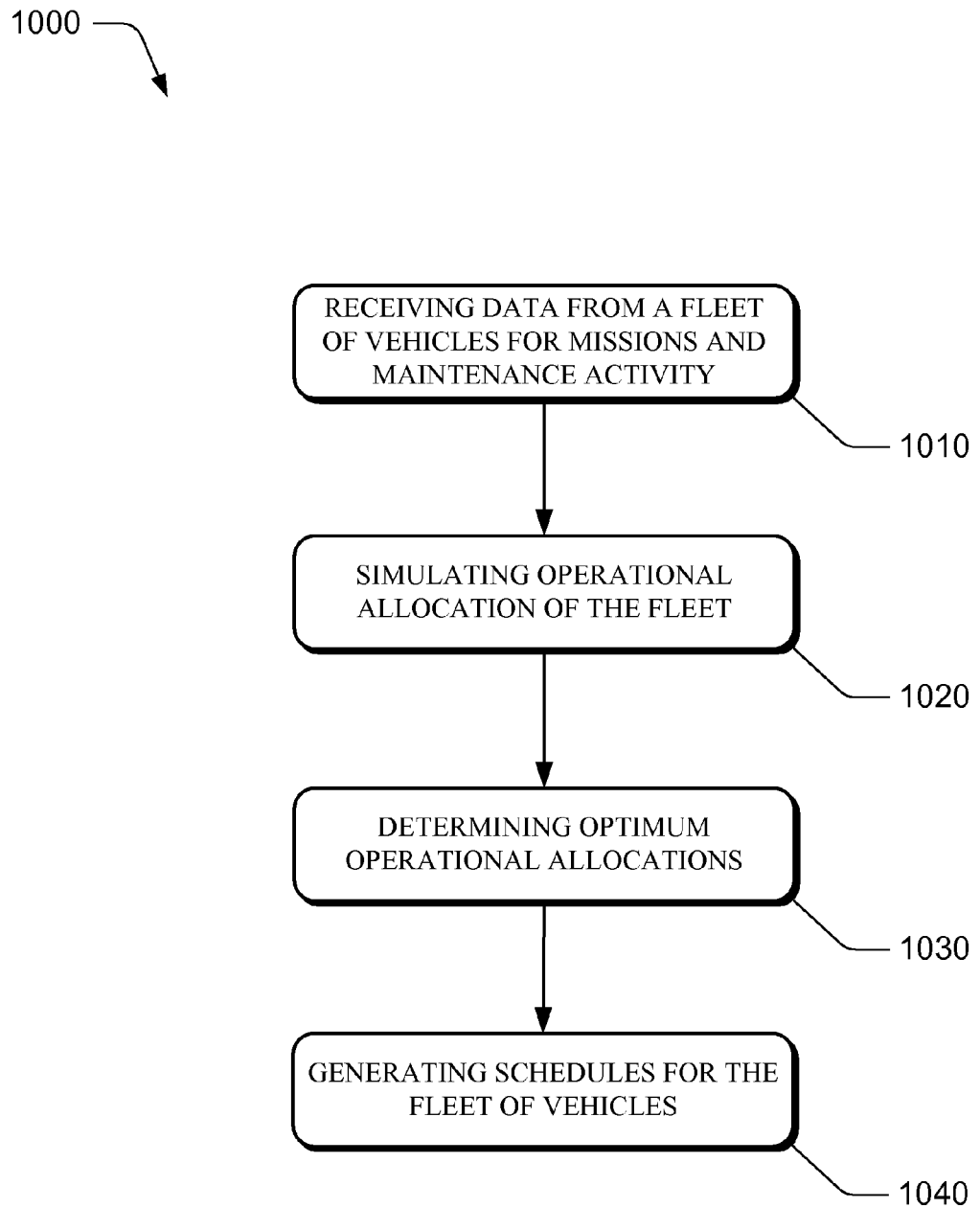
FIG. 10 is a flow chart of a model for aiding in prognostic condition assessment decisions in accordance with yet another embodiment of the invention.

FIG. 10 is a flow chart of a model 1000 for aiding in prognostic condition assessment decisions in accordance with yet another embodiment of the invention. The prognostic condition assessment decisions may include simulating real-time decision-making or it may include longer term strategic decision-making integrated into a system health analysis model. For example, in real-time decision-making, an operational controller may decide whether or not a particular flight should occur or whether it should be aborted. Conversely, longer term strategic decision-making integrated in a system health analysis model may apply to the larger operations of flights, and may not include real-time decision-making for individual flights. Further, decision rules may be created to facilitate decision making, either for the real-time occurrences or for the longer term occurrences.

At block 1010, data is received relating to a fleet of vehicles for missions and maintenance activity. The fleet of vehicles, as illustrated above in FIG. 4, may be a fleet of airplanes, automobiles, trucks, maritime vessels, weapons, missiles, unmanned aerial vehicles, machinery and equipment used in above-ground or underground mining, buses, trains, railroad equipment, and other types of manned or unmanned mobile platforms. For example, the fleet of vehicles may be a fleet of Boeing 747 airplanes in an existing operational status. Further, the data for missions and maintenance activity may be derived from a number of sources such as actual operational data, mission planning data, maintenance history data, and the like. Some of the data for missions and maintenance activity may be actual data, and some may be hypothetical data.

At block 1020, an operational allocation of the fleet is simulated. For example, the inputs at block 1010 are manipulated by a computer program (FIG. 2) to generate a simulation of a fleet of vehicles in operation over a specified period of time. This simulation may include missions, maintenance action, delays, and other events associated with the operations of a fleet of vehicles.

At block 1030, the optimum operational allocations are determined. The optimum operation allocations may include any operations which maximize the reliability of missions, reduce the operational costs of the fleet of vehicles, or achieve any other desired result of an operational control group. Further, multiple factors may be weighed in order to achieve a preferred operational allocation. For example, mission reliability and operational costs may be weighed such that an ideal operational allocation results in a desired proportional performance of both factors. Maintenance policies, plans, and decision tools may be developed to aid field decision makers in allocating resources and optimizing usage.

At block 1040, the schedules for the fleet of vehicles are generated. The schedules may be generated from the optimum operational allocations which best satisfy the operational control group's requirements. The operational control group may desire to create alternative schedules which provide flexibility upon the occurrence of unforeseen events, such as harsh environmental conditions, maintenance backlogs, higher usage rates, or similar unexpected events which may disrupt the schedules of a fleet of vehicles.

Figure 11:
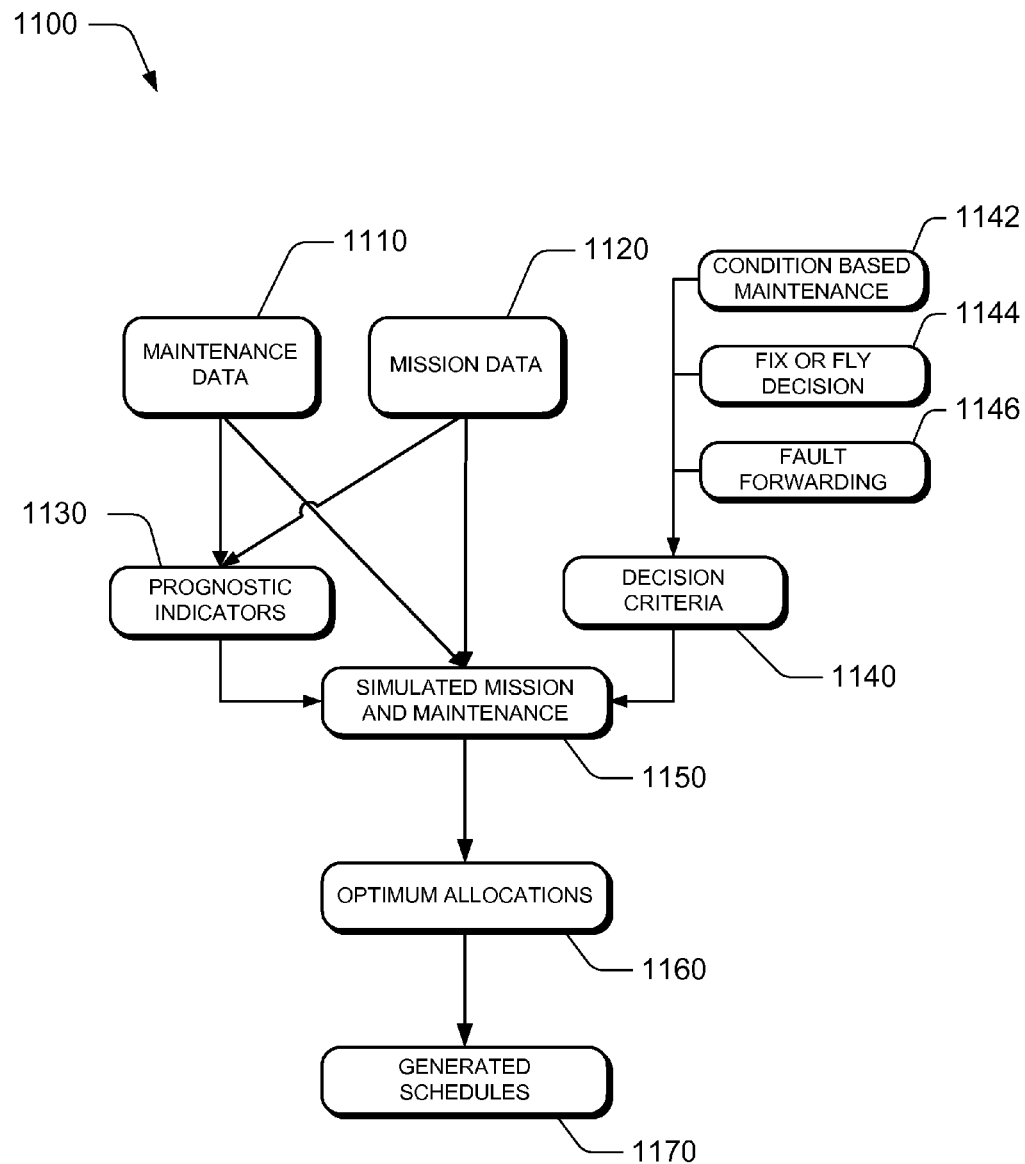
FIG. 11 is a flow chart of another model for aiding in prognostic condition assessment decisions.

FIG. 11 is a flow chart 1100 of another model for aiding in prognostic condition assessment decisions in accordance with another alternate embodiment of the invention. At block 1110 and 1120, input data from a fleet of vehicles is obtained from one or more sources. Block 1110 includes maintenance related data while block 1120 includes mission related data. The data in blocks 1110, 1120 may be used to create prognostic indicators at block 1130. For example, prognostic indicators may include unscheduled events that occur for a fleet of vehicles that may be predicted or statistically modeled. Alternatively, prognostic health indicators may only use maintenance data 1110 or mission requirements 1120.

At block 1140, decision criteria are compiled. Decision criteria may include condition based maintenance 1142, fix or fly decisions 1144, and fault forwarding 1146. Additionally, other information, algorithms, statistical models, and the like may be incorporated to create decision criteria for a fleet of vehicles. For example, the decision criteria for a fleet of vehicles may include decisions of when maintenance must be performed on an airplane or when the airplane is able to fly a mission. In an embodiment, the decision criteria may be predetermined computer instructions that make decisions based on a status of a vehicle. Additionally, a user may make decisions, such as to abort a mission or to continue the mission, in a real-time environment. In yet another embodiment, a user may receive feedback from the model 1100 which depicts the results of a real-time decision.

At block 1150, mission and maintenance are simulated using at least some of the maintenance data 1110, mission data 1120, prognostic indicators 1130, and decision criteria 1140. In some embodiments, the simulated mission and maintenance 1150 may include other elements, such as operational control group inputs. At block 1160, the optimum allocations are determined based on the simulated allocation. The optimum allocations may be a single allocation of maintenance and missions of a fleet of vehicles, or it may be multiple allocations of the fleet of vehicles, each emphasizing different operational factors, or combination thereof. At block 1170, schedules are generated for the fleet of vehicles based on the optimum allocations of the fleet of vehicles. The optimum allocations 1160 and generated schedules 1170 may be used by operational control groups to aid decisions on allocation of vehicles in a fleet of vehicles to further organizational objectives.

Embodiments of methods and systems in accordance with the present invention may provide significant advantages over the prior art. For example, embodiments of the present invention may enable detailed studies of fleets of vehicles to determine cost sensitivities associated with a wide variety of inputs and assumptions. These studies may then be used to focus quality improvement and cost reduction activities to achieve increased benefit. Such studies may also be used to compare fleets of vehicles, including vehicles of the same type under different operating conditions, or vehicles of different types under the same operating conditions. Embodiments of the invention may also advantageously permit various factors to be included in the modeling and analyses of system health operations, including some factors that have not previously been effectively considered or modeled. Ideally, embodiments of the methods and systems for analyzing system health operations in accordance with the present invention may provide improved performance and reduced ownership costs of fleets of vehicles in comparison with the prior art. This analysis capability may not only improve the prior art, but may reduce the overall analysis time and costs, thus reducing overall development costs for vehicles when compared to the prior art.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for providing a system health operations analysis model, comprising:
   determining a first system health operations analysis of a first fleet of vehicles;
   determining a second system health operations analysis of a second fleet of vehicles, the second system health operations analysis including an alternative health operations system and at least one of hypothetical operational data and hypothetical maintenance data for the second fleet of vehicles;
   comparing the first and second system health operations analyses; and
   generating a system health operations output of first and second system health operations analyses, wherein the output of the comparison contains data enabling a determination of the impact of the alternative health operations device on the second fleet of vehicles.

2. The method of claim 1, wherein the first and second system health operations analyses include mission data and maintenance data for the first and second fleet of vehicles, respectively.

3. The method of claim 2, wherein the maintenance data of at least one of the first and second fleet of vehicles includes at least one of fault forwarding, event horizon, and condition based maintenance.

4. The method of claim 1, wherein at least one of the first and second system health operations analyses incorporates actual data relating to an operational fleet of vehicles.

5. The method of claim 1, wherein at least one of the first and second system health operations analyses includes generating assumption data for at least one untested fleet characteristic relating to a corresponding at least one of the first and second fleet of vehicles.

6. The method of claim 1, wherein at least one of the first and second system health operations analyses includes:
   production processes and metrics;
   mission processes and metrics;
   maintenance processes and metrics;
   command and control processes and metrics; and
   fleet management processes and metrics.

7. The method of claim 1, wherein the generated output includes deriving an optimum health management solution for at least one of the first and second fleet of vehicles.

8. The method of claim 1, wherein at least one of determining a first system health operations analysis and determining a second system health operations analysis includes:
   providing a plurality of inputs to a computer-based model of system health operations of a vehicle fleet, the plurality of inputs including at least one of actual data and hypothetical data;
   providing a plurality of system sensitivities to the computer-based model of system health operations of the vehicle fleet, each system sensitivity being associated with a corresponding one of the plurality of inputs;

providing a plurality of health management solution assumptions to the computer-based model of system health operations of the vehicle fleet, each health management solution assumption being associated with a corresponding one of the plurality of inputs;

providing a plurality of benefit sensitivities to the computer-based model of system health operations of the vehicle fleet, each benefit sensitivity being associated with a corresponding one of the plurality of inputs; and computing a system health operations analysis of the vehicle fleet using the computer-based model of system health operations based on the plurality of inputs, the plurality of system sensitivities, the plurality of health management solution assumptions, and the plurality of benefit sensitivities.

9. The method of claim 8, wherein computing a system health operations analysis of the vehicle fleet includes parametrically varying one or more of the plurality of inputs, the plurality of system sensitivities, the plurality of health management solution assumptions, and the plurality of benefit sensitivities.

10. A computer-based system for providing a system health operations analysis comprising:

an analysis component configured to compute a first system health operations analysis of a first fleet of vehicles and a second system health operations analysis of a second fleet of vehicles, the system health operations analysis including an alternative health operations system and prognostic data to anticipate unscheduled fleet maintenance;

a comparator configured to receive the system health operations analyses from the analysis component and to perform a comparison between the first and second system health operations analyses; and an output component configured to receive the comparison from the comparator and to provide a visual display of the comparison between the first and second system health operations analyses, wherein the output of the comparison contains data enabling a determination of the impact of the alternative health operations device on the second fleet of vehicles.

11. The system of claim 10, wherein at least one of the first and second system health operations analyses includes mission data inputs and maintenance data inputs.

12. The system of claim 10, wherein at least one of the first and second system health operations analysis is configured to implement design maintenance policies and decision tools to support condition based maintenance concepts.

13. The system of claim 10, wherein the second fleet of vehicles includes the alternative health operations system, design, or capability which is not included in the first fleet of vehicles.

14. The system of claim 10, wherein the output provided by the output component includes cost metrics and reliability metrics.

15. The system of claim 10, wherein the analysis component is configured to provide the system health operations analyses based on mission requirements, maintenance requirements, prognostic health indicators, maintenance schedules, and fleet resource availability, and is further configured to determine an optimum health management solution for at least one of the first and second fleet of vehicles.

16. The system of claim 10, wherein the analysis component is configured to provide the system health operations analysis based on a condition-based maintenance.

17. The system of claim 10, wherein the analysis component is further configured to:

receive a plurality of inputs into a model of system health operations of a vehicle fleet, the plurality of inputs including at least one of actual data and hypothetical data;

receive a plurality of system sensitivities into the model of system health operations of the vehicle fleet, each system sensitivity being associated with a corresponding one of the plurality of inputs;

receive a plurality of health management solution assumptions into the model of system health operations of the vehicle fleet, each health management solution assumption being associated with a corresponding one of the plurality of inputs;

receive a plurality of benefit sensitivities into the model of system health operations of the vehicle fleet, each benefit sensitivity being associated with a corresponding one of the plurality of inputs; and compute a system health operations analysis of the vehicle fleet using the model of system health operations based on the plurality of inputs, the plurality of system sensitivities, the plurality of health management solution assumptions, and the plurality of benefit sensitivities.

18. The system of claim 17, wherein the analysis component is further configured to compute the system health operations analysis of the vehicle fleet by parametrically varying one or more of the plurality of inputs, the plurality of system sensitivities, the plurality of health management solution assumptions, and the plurality of benefit sensitivities.

19. One or more computer-readable media comprising computer executable instructions that, when executed, perform a method of health operations analysis, comprising:

determining a system health operations analysis of a first fleet of vehicles to determine the operational costs of the first fleet of vehicles;

determining a system health operations analysis of a second fleet of vehicles to determine the operational costs of the second fleet of vehicles, the second system health operations analysis including an alternative health operations system, and wherein determining the system health operations analysis of at least one of the first and second fleets includes determining the system health operations analysis based on at least one of an actual operational data, an actual maintenance data, a hypothetical operational data, and a hypothetical maintenance data;

comparing the first and second system health operations analyses and operational costs; and generating a system health operations output of the compared first and second system health operations analyses including at least one of cost metrics and reliability metrics, wherein the output of the comparison contains data enabling a determination of the impact of the alternative health operations device on the second fleet of vehicles.

20. The computer-readable media of claim 19, wherein determining the system health operations analysis at least one of at least one of the first and second fleets of vehicles includes:

providing a plurality of inputs to a model of system health operations of a vehicle fleet, the plurality of inputs including at least one of actual data and hypothetical data;

providing a plurality of system sensitivities to the model of system health operations of the vehicle fleet, each system sensitivity being associated with a corresponding one of the plurality of inputs;

providing a plurality of health management solution assumptions to the model of system health operations of the vehicle fleet, each health management solution assumption being associated with a corresponding one of the plurality of inputs;

providing a plurality of benefit sensitivities to the model of system health operations of the vehicle fleet, each benefit sensitivity being associated with a corresponding one of the plurality of inputs; and computing a system health operations analysis of the vehicle fleet using the model of system health operations based on the plurality of inputs, the plurality of system sensitivities, the plurality of health management solution assumptions, and the plurality of benefit sensitivities.

* * * * *